Feb. 14, 1961 W. B. PESTER 2,971,434
PROJECTION SLIDE HOLDER
Filed Jan. 23, 1957 2 Sheets-Sheet 2

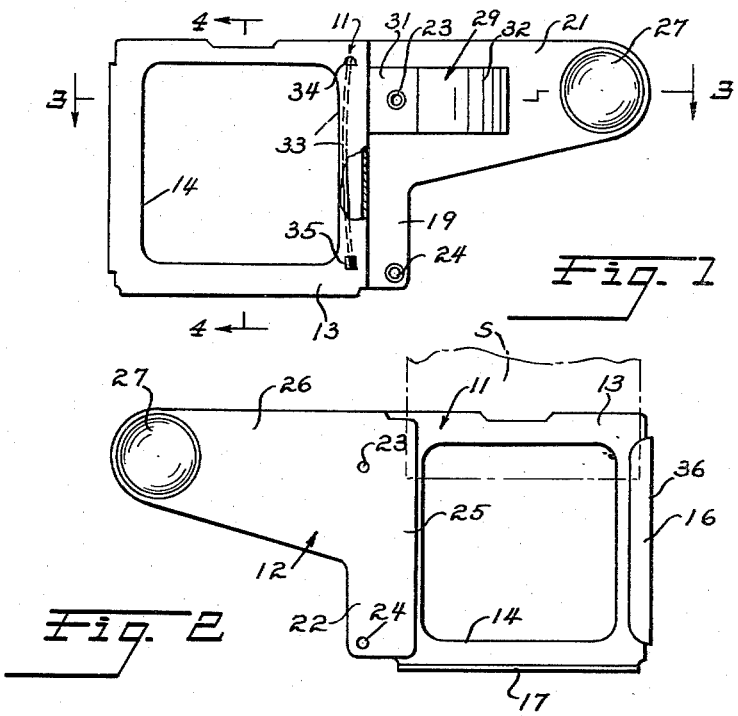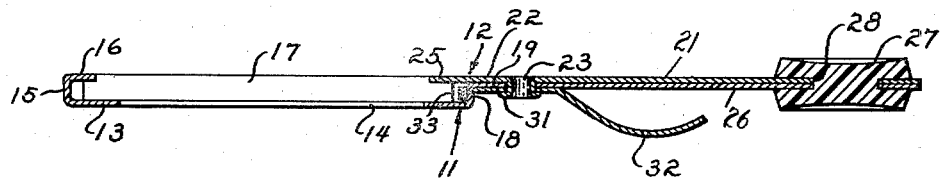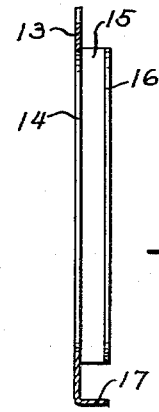

INVENTOR
WILLIAM BRUCE PESTER

BY
ATTORNEYS

United States Patent Office 2,971,434
Patented Feb. 14, 1961

2,971,434
PROJECTION SLIDE HOLDER

William Bruce Pester, Ann Arbor, Mich., assignor, by mesne assignments, to Sylvania Electric Products Inc., Wilmington, Del., a corporation of Delaware Filed Jan. 23, 1957, Ser. No. 635,760

7 Claims. (Cl. 88—28)

This invention relates to a special slide holder of the type employed for exhibiting 35 mm. and like mounted transparencies and is particularly concerned with such a slide holder having novel structure and positioning arrangements.

The slide holder of the invention is particularly adapted for exhibiting single slides when inserted into the guide channels of a normally automatic slide changer of the type shown in Wiklund Patent No. 2,711,602, issued June 28, 1955. In that slide changer a laterally shiftable shutter structure is engaged by the slide and moved out of the projection path as the slide enters projection position. The slide holder of the invention also incorporates a shutter engaging and shifting portion.

It is the major object of the invention to provide a projection slide holder of novel construction.

A further object of the invention is to provide a projection slide holder having a novel construction and including a special locating spring.

It is a further object of the invention to provide a novel projection slide holder having a shutter contacting portion.

A further object of the invention is to provide a novel projection slide holder of specially fabricated construction.

Further objects of the invention will appear as the description proceeds in connection with the appended claims and the annexed drawings wherein:

Figure 1 is a side elevation of a projection slide holder according to a preferred embodiment of the invention;

Figure 2 is an opposite side elevation of the projection slide holder;

Figure 3 is a section on line 3—3 of Figure 1;

Figure 4 is a section on line 4—4 of Figure 1;

Figure 5:
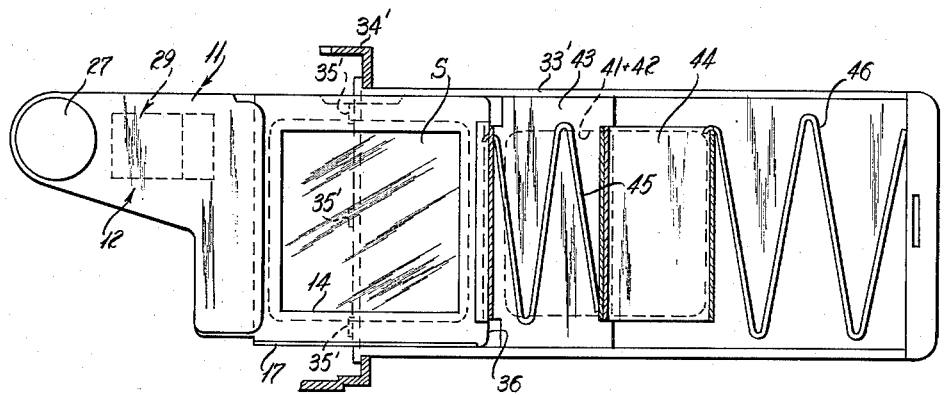
Figure 5 is a fragmentary side elevation showing how the slide holder of the invention is used.

The slide holder of the invention is composed mainly of two sheet metal frame parts 11 and 12 stamped or otherwise formed to shape and fastened together rigidly.

Part 11 comprises a generally rectangular or square body 13 lying in a plane and formed with a substantially rectangular or square opening 14. Body 13 has an extension bent at right angles to provide a narrow end wall 15 and then again at right angles toward the opening to provide a narrow side wall 16. Walls 15 and 16 together with the adjacent portion of body 13 define an inwardly open slide edge receiving channel parallel to one side edge of opening 14 as will appear.

The bottom of body 13 is bent at right angles to provide a slide rest ledge 17 parallel to the bottom of opening 14 and on the same side as the channel.

Body 13 is formed with a right angle bend portion 18 providing a narrow end wall similar and parallel to wall 15, and is then bent away at right angles to provide a flat attachment portion 19 parallel to wall 16. The attachment portion 19 extends the height of the holder and terminates laterally in a reduced handle section 21 having a rounded end.

Part 12 is entirely flat and comprises a vertically disposed attachment portion 22 overlying attachment portion 19 of part 11 and rigidly secured thereto as by two rivets 23 and 24. As shown in Figure 3 attachment portion 19 extends beyond wall 18 to provide a wall 25 lying in the plane of wall 16, and walls 25 and 18 and the adjacent portion of body 13 define an inwardly open slide edge receiving channel parallel to the side edge of opening 14 and opposite and parallel to the other channel.

Part 12 terminates in a reduced handle section 26 overlying the handle section of part 11, and near their outer ends these handle sections are secured together rigidly into a unitary handle by a concave-sided button 27 usually of plastic. Button 27 may be composed of two similar halves heat or adhesively sealed together at handle opening 28, or may be an integral plastic button molded in situ, but in any event it fastens the parts 11 and 12 tightly together at this point and provides a finger grip for the operator.

A leaf spring 29 is secured on the side of the assembly and comprises a flat section 31 secured by upper rivet 23 and an arcuate spring beam 32 which when not compressed extends beyond the plane of body 13. Rocking of spring leaf 29 about the axis of rivet 23 is prevented by engagement of the end of the leaf with wall 18.

Usually a light leaf spring 33 bowed toward the open side of the channel is secured within the channel at wall 18, and this spring has its ends fixed in suitable openings 34 and 35 in part 11.

In using the slide holder, a mounted transparency S is simply inserted into the open tops of the side channels and pushed down to rest on ledge 17. The slide is thus automatically centered with opening 14 so as to be disposed in the projection path and lightly urged toward wall 15 by bias spring 33. Then the operator grasps the holder with button 27 between his thumb and forefinger and thrusts it into the side open projector guide channel at the projection aperture. Where the channel is that of the afore-mentioned Wiklund patent, the flat shutter abutment surface 36 of wall 15 which is parallel to the side of opening 14 engages the shutter and pushes it aside to permit the entry of the slide into the projection path.

The function of spring 29 is to bias the entire slide holder in the projector guide channel axially of the projection axis, to prevent slide holder movement during projection.

The invention thus provides a mechanically simple but unique inexpensive slide holder that is easily manipulated and maintains itself against movement due to vibration when mounted in the projector. While the slide holder has been described as fabricated of sheet metal parts it is within the scope of certain aspects of the invention, as will be apparent from the claims, to unitarily mold the frame parts of plastic.

Figure 6:
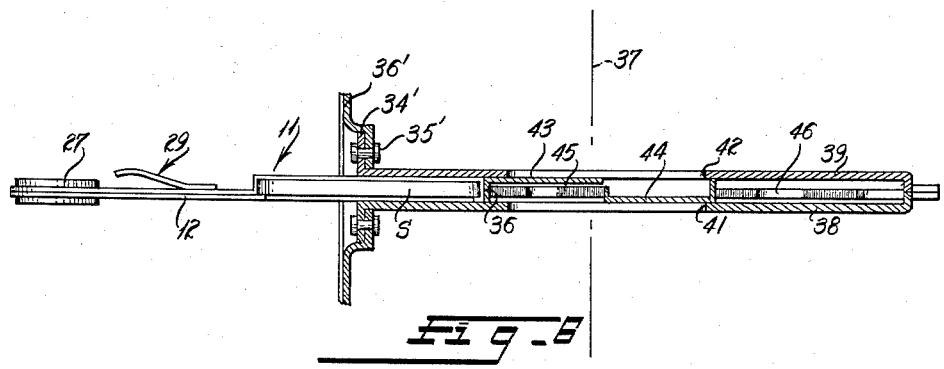
Figure 6 is a top plan view in section showing further the relationship of the slide holder to the shutter.

Figures 5 and 6 illustrate the use of the slide holder of the invention in a known and widely used projector assembly. The illustrated slide holder and shutter support 33' is in the form of a thin rectangular tube having at its open end a flange 34' secured as by rivets 35' to a bracket 36' that in turn is mounted on the projector by suitable means (not shown). Support 34' extends at right angles to the projection axis 37 and its front wall 38 is parallel to rear wall 39. These walls are opaque except for aligned openings 41 and 42.

Disposed between walls 38 and 39 is a slidable collapsible shutter assembly consisting of opaque shutter members 43 and 44 connected by a spring 45 which normally tends to separate them. Another spring 46 disposed between shutter member 44 and the fixed end wall of support 34' biases the shutter to the left in Figures 5 and 6.

The foregoing support and shutter construction is essentially the same as that of Wiklund Patent No. 2,711,602 which represents one form of apparatus with which the invention may be used. The slide holder of the invention is used to show a single slide when the multiple slide magazine of Wiklund is removed.

Figures 5 and 6 show the slide holder of the invention as it enters the open side mouth of support 33' with a slide S in the holder. The shutter assembly is shown in its normal extended position covering the projection aperture at 41, 42. The bottom ledge 17 of the slide holder slides along the bottom wall of support 33' and the vertical surface 36 contacts the left side of shutter member 43 as shown in Figures 5 and 6, and as the slide holder moves on to locate slide S in the projection aperture 41, 42 the shutter assembly 43, 44 collapses and slides to the right as in said Wiklund patent to uncover the projection aperture.

When the slide holder 11 is in the support 33' the spring 29 slidably engages the rear wall of the support and is compressed in the direction of the projection axis to maintain the slide holder position in the support.

After projection, when the slide holder 11 is pulled out of support 33', the springs 45 and 46 extend the shutter assembly and recover the exposure aperture as in said Wiklund patent.

It will be appreciated that the slidable shutter and associated support may take any suitable form, the foregoing being described only by way of example.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A projection slide holder for use in a projection device having an apertured slide receiving housing forming an open slide holder guide channel, a shutter carried by said housing in said guide channel for covering said housing aperture in closed position, and yieldable means urging said shutter into registry with said housing aperture, said slide holder comprising a support frame having a projection aperture adapted to register with said housing aperture when said support frame is inserted into said guide channel, opposed slide edge receiving channels on opposite sides of said support frame aperture and a slide supporting ledge below said support frame aperture, one of said channels at one side of said support frame aperture having an exterior end surface adapted to abuttingly engage said shutter against the force exerted by said yieldable means when said support frame is inserted into said housing to shift said shutter out of registry with said housing aperture, a handle portion projecting away from the other side of said support frame aperture and adapted to at least partially protrude beyond said guide channel when said support frame aperture is in registry with said housing aperture, and a holder positioning spring mounted on said other side of said support frame aperture adjacent said handle portion and extending away from said support frame for engagement with the interior of said housing when said support frame is inserted into said housing in a position to displace said shutter out of registry with said housing aperture, said spring being compressible in the direction of said support upon engagement with said housing to establish a holding force that is opposed to the force exerted by said yieldable means, the holding force exerted by said spring normally being sufficiently great to overcome the tendency of the force exerted by said yieldable means urging said shutter into registry with said housing aperture, thereby being operable to maintain said support frame positioned in said housing with said projection aperture in registry with said housing aperture.

2. The slide holder defined in claim 1 wherein said spring is an arcuate leaf spring having one end secured to said support frame and the other end free to be compressed in a direction that is normal to the direction of the force exerted by said yieldable means.

3. A projection slide holder for use in a projection device having an apertured slide receiving housing forming an open slide holder guide channel, a shutter assembly operably mounted in said guide channel for sliding movement into and out of registry with said housing aperture, and yieldable means continuously urging said shutter assembly into registry with said housing aperture, said slide holder comprising one frame part having a body formed with a picture projection aperture adapted to register with said housing aperture when said frame part is slidably inserted into said guide channel, an integral first slide edge receiving channel on said part facing said aperture and extending along one side of said aperture, an integral slide rest ledge on said part at the bottom of said aperture, a handle portion on said part including an extension parallel to but displaced from the plane of said body and joined to said body by a narrow integral wall, and a second flat frame part having a handle portion coextensive with the handle portion of the first frame part and secured rigidly thereto and having an edge extension beyond said wall that coacts with said wall and the adjacent portion of said body to form a second slide edge receiving channel parallel to and facing said first channel, said integral channel having an exterior flat upstanding surface adapted to abuttingly engage and displace said shutter assembly to a position out of registry with said housing aperture against the bias of said yieldable means when said first frame part is inserted into said guide channel, and spring means mounted on said first frame part adjacent said first frame part handle portion and adapted to engage the interior of said housing and to be compressed thereby when said first frame part is inserted into said guide channel with said projection aperture in registry with said housing aperture, thereby establishing a force opposed to the bias of said yieldable means, the force exerted by said spring means being sufficiently great to overcome the bias of said yieldable means for holding said frame parts in position in said guide channel and for maintaining said shutter assembly in displaced position out of registry with said housing aperture.

4. The slide holder defined in claim 3 wherein the outer ends of said handle portion are secured together by a finger grasping button for the operator.

5. The slide holder defined in claim 3 wherein said spring means comprises an arcuate leaf spring having one end secured to one of said frame parts and the other end being free to be compressed and position the holder when the latter is inserted into said guide channel.

6. In a projection assembly, an apertured slide receiving housing; a shutter assembly carried by said housing for covering the aperture; yieldable means urging said shutter assembly to closed position in registry with said aperture; and a projection slide holder for positioning a slide in registry with said housing aperture and removably carried as a unit for sliding movement in said housing, said slide holder comprising an apertured support frame, opposed slide edge receiving channels on opposite sides of said support frame aperture and a slide supporting ledge below said support frame aperture, a shutter abutment surface on said support at one side of said aperture lying in a plane normal to said ledge and engageable with said shutter assembly when said holder is inserted into said housing to cause displacement of said shutter assembly against the force exerted by said yieldable means to an opened position out of registry with said housing aperture by movement of said holder into said housing, means including a compressible and expansible positioning spring on said support at the other side of said support frame aperture for maintaining said projection aperture in registry with said housing aperture when said holder is inserted in said housing to move said shutter assembly to opened position, said spring being disposed on one side of said support and projecting away therefrom for surface engagement with said housing and exerting a force sufficiently great to overcome the tendency of the force exerted by said yieldable means to move said shutter assembly to closed position; and a handle projecting from said support at said other side of said support frame aperture for removing said holder from said housing.

7. In a projection assembly, a slide receiving apertured housing forming an open slide holder guide channel; a shutter assembly carried by said housing in said guide channel for sliding movement into and out of registry with said housing aperture; yieldable means continuously urging said shutter assembly into registry with said housing aperture; and a projection slide holder adapted to be slidably and removably received in said guide channel for positioning a slide in registry with said housing aperture, said slide holder comprising one frame part having a body formed with a picture projection aperture which is registrable with said housing aperture when said frame part is slidably inserted into said guide channel, an integral first slide edge receiving channel on said part facing said aperture and extending along one side of said aperture, an integral slide rest ledge on said part at the bottom of said aperture, a handle portion on said part and protruding at least partially beyond said housing when said holder is positioned in said guide channel with said projection aperture in registry with said housing aperture, said handle portion including an extension parallel to but displaced from the plane of said body and joined to said body by a narrow integral wall, and a second flat frame part having a handle portion coextensive with the handle portion of the first frame part and secured rigidly thereto and having an edge extension beyond said wall that coacts with said wall and the adjacent portion of said body to form a second slide edge receiving channel parallel to and facing said first channel, said integral channel having an exterior flat upstanding surface abuttingly engageable with said shutter assembly when said holder is inserted into said housing so that sliding movement of said holder in said guide channel causes said shutter to be displaced against the force exerted by said yieldable means to a position out of registry with said housing aperture, means including a compressible and expansible positioning leaf spring for maintaining said shutter assembly out of registry with said housing aperture against the force of said yieldable means, said spring having one end secured to one of said frame parts and the other end in free sliding engagement with the interior of said housing and exerting a force that is sufficiently great to overcome the tendency of the force exerted by said yieldable means to move said shutter assembly into registry with said housing aperture, thereby maintaining said holder in position with said projecting aperture in registry with said housing aperture and said shutter assembly in displaced position against the force exerted by said yieldable means.

References Cited in the file of this patent

UNITED STATES PATENTS

| | | |
|---|---|---|
| 1,233,407 | Schwanhausser | July 17, 1917 |
| 2,113,397 | Croft | Apr. 5, 1938 |
| 2,136,746 | Kleerup | Nov. 15, 1938 |
| 2,276,735 | Miller | Mar. 17, 1942 |
| 2,298,369 | Greaves | Oct. 13, 1942 |
| 2,335,326 | Walter | Nov. 30, 1943 |
| 2,468,566 | Marcus et al. | Apr. 26, 1949 |
| 2,711,602 | Wiklund | June 28, 1955 |